(12) United States Patent
Uchiyama et al.

(10) Patent No.: US 8,921,434 B2
(45) Date of Patent: Dec. 30, 2014

(54) POLYLACTIC ACID COMPOSITION, FOAM MOLDED ARTICLE THEREOF AND METHOD OF PRODUCING THE SAME

(75) Inventors: Kosuke Uchiyama, Kyoto (JP); Kazunori Tsuda, Tokyo (JP); Tenya Suzuki, Tokyo (JP)

(73) Assignees: Kosuke Uchiyama, Kyoto (JP); Kazunori Tsuda, Tokyo (JP)

( * ) Notice: Subject to any disclaimer, the term of this patent is extended or adjusted under 35 U.S.C. 154(b) by 8 days.

(21) Appl. No.: 13/636,223

(22) PCT Filed: Mar. 29, 2011

(86) PCT No.: PCT/JP2011/057822
§ 371 (c)(1),
(2), (4) Date: Oct. 24, 2012

(87) PCT Pub. No.: WO2011/122626
PCT Pub. Date: Oct. 6, 2011

(65) Prior Publication Data
US 2013/0203877 A1    Aug. 8, 2013

(30) Foreign Application Priority Data
Mar. 29, 2010   (JP) ................................ 2010-092595

(51) Int. Cl.
*C08G 63/91*    (2006.01)
*B29C 47/00*    (2006.01)
(Continued)

(52) U.S. Cl.
CPC ............ *C08G 63/91* (2013.01); *B29C 47/0004* (2013.01); *C08G 18/428* (2013.01); *C08G 18/6644* (2013.01); *C08G 18/73* (2013.01); *C08G 63/08* (2013.01);
(Continued)

(58) Field of Classification Search
CPC ............................... C08J 9/122; C08J 2367/04
See application file for complete search history.

(56) References Cited

U.S. PATENT DOCUMENTS

2007/0293593 A1 * 12/2007 Harfmann ....................... 521/79
2008/0262118 A1 * 10/2008 Cink et al. .................... 521/134

FOREIGN PATENT DOCUMENTS

JP          06287347   A  * 10/1994
JP       2000017039   A  *  1/2000
(Continued)

OTHER PUBLICATIONS

Kubo, T. Derwent abstract for JP 2000017039. Copyright 2013; Patent publication in 2000.*
(Continued)

*Primary Examiner* — Randy Gulakowski
*Assistant Examiner* — Christina Wales
(74) *Attorney, Agent, or Firm* — Kirschstein et al.

(57) ABSTRACT

A polylactic acid composition is produced with an MI value of 0.05 or more and 5 or less, the MI value being measured at 190° C. under a load of 21.6 kg in accordance with JIS K7210 (ISO 1133). A polylactic acid is crosslinked with a polyisocyanate to generate a cross-linked polylactic acid, including a large cross-linked polylactic acid molecule which inhibits foaming. The cross-linked polylactic acid is mechanically grinded-by applying a shear force to decrease a molecular weight of the large cross-linked polylactic acid molecule. The amount of the polyisocyanate combined is 0.4 to 5% by weight based on the polylactic acid. The grinding is conducted in supercritical condition of an inert gas. A foam molded article is made from the polylactic acid composition.

12 Claims, 5 Drawing Sheets

(51) Int. Cl.

| | | |
|---|---|---|
| *C08G 18/42* | (2006.01) | |
| *C08G 18/66* | (2006.01) | |
| *C08G 18/73* | (2006.01) | |
| *C08G 63/08* | (2006.01) | |
| *C08G 63/88* | (2006.01) | |
| *C08J 9/12* | (2006.01) | |
| *C08K 3/26* | (2006.01) | |
| *C08K 3/34* | (2006.01) | |
| *C08K 5/29* | (2006.01) | |
| *B29C 47/62* | (2006.01) | |
| *B29C 47/36* | (2006.01) | |
| *B29C 47/76* | (2006.01) | |
| *C08G 101/00* | (2006.01) | |

(52) U.S. Cl.
 CPC ................ *C08G 63/88* (2013.01); *C08J 9/122* (2013.01); *C08K 3/26* (2013.01); *C08K 3/34* (2013.01); *C08K 5/29* (2013.01); *B29C 47/627* (2013.01); *B29C 47/364* (2013.01); *B29C 47/0009* (2013.01); *B29C 47/76* (2013.01); *C08G 2101/00* (2013.01); *C08J 2201/024* (2013.01); *C08J 2201/03* (2013.01); *C08J 2203/08* (2013.01); *C08J 2367/04* (2013.01)

USPC ............... 521/79; 264/53; 521/159; 524/425; 524/451; 525/440.04

(56) References Cited

FOREIGN PATENT DOCUMENTS

| JP | 2000-169546 | 6/2000 |
|---|---|---|
| JP | 2001-098044 | 4/2001 |
| JP | 2006-224628 | 8/2006 |
| JP | 2007-254522 | 10/2007 |
| JP | 2009-083484 | 4/2009 |
| JP | 2009-235316 | 10/2009 |
| WO | 2005-097878 | 10/2005 |

OTHER PUBLICATIONS

Nippon Polyurethane Industry. Millionate MR-200 Material Safety Data Sheet. 2003.*

Lee, S.T.; Kareko, L.; Jun, J. "Study of Thermoplastic PLA Foam Extrusion" Journal of Cellular Plastics vol. 44 pp. 293-305. 2008.*

"Material Saftey Data Sheet Product Name: Millionate MR-200" by Nippon Polyurethane Industry Co., Ltd. Jul. 23, 2003.*

* cited by examiner

A Screw tip

B Groove shape example of lead of 50 mm and 12 threads

POLYLACTIC ACID COMPOSITION, FOAM MOLDED ARTICLE THEREOF AND METHOD OF PRODUCING THE SAME

TECHNICAL FIELD

The present invention relates to a polylactic acid composition, a polylactic acid foam molded article and a method of producing the foam molded article.

BACKGROUND ART

Polylactic acid is produced from starch which is a recycled material and is an environmentally friendly resin because of the biodegradability. Products produced using polylactic acid can be disposed of by landfill as compost because of the biodegradability.

Although polystyrene foam molded articles are frequently used as e.g. food containers and cushioning packaging materials, they are needed to be collected for disposal or be recycled by reason of the non-biodegradability.

Patent document 1 describes a method of producing a foam molded article by adding polyalcohols such as glycerin, erythritol and pentaerythritol or polycarboxylic acids such as trimellitic acid and pyromellitic acid to polylactic acid which is substantially amorphous, and cross-linking by polyisocyanate to increase the molecular weight.

In order to obtain a polylactic acid composition having stable melt viscosity, a condition to satisfy the following formula is thought to be good.

$$(0.5 \times n - 100 EM_i) M_c / 10 NM_i \leq W \leq (0.5 \times n - 100 EM_i) M_c / NM_i$$

(wherein E: the number of terminal carboxyl groups of polylactic acid (eq/gr)
x: the amount of an isocyanate compound to be added (wt %)
n: the number of functional groups of the isocyanate compound (eq/gr)
$M_i$: the molecular weight of the isocyanate compound (gr)
W: the amount of a polyalcohol or a polycarboxylic acid to be added (wt %)
N: the number of functional groups of the polyalcohol or polycarboxylic acid (eq/mol)
$M_c$: the molecular weight of the polyalcohol or polycarboxylic acid (gr))

It is thought that when only polylactic acid is used, a stable composition with high melt viscosity which is appropriate for foam moldings is hard to be obtained.

Also, it is thought to be appropriate when the compounding amount of polyisocyanate is 0.3 to 3% by weight and preferably 0.7 to 2% by weight. When polyisocyanate is insufficient, since a molecular weight of polylactic acid after reactions is too low, only foam molded products with a low expansion ratio can be obtained. On the other hand, it is thought that when polyisocyanate is excessive, good foam molded products cannot be obtained because gelation occurs.

A foam molded article is foam-molded as follows: after impregnated with a foaming agent, pre-expanded beads are transferred and poured into a mold, and the beads are heated with steam to foam. As foaming agents, hydrocarbons such as propane, n-butane, iso-butane, n-pentane, iso-pentane, neopentane, cyclopentane and hexane; halogenated hydrocarbons such as chloromethane, methylene chloride and dichlorodifluoromethane; and ethers such as dimethylether and methylethylether are used, and as auxiliary foaming agents, alcohols having 1 to 4 carbon atoms, ketones, ethers, benzene, toluene and the like are used.

Patent Document 2 describes that a foam nucleating agent is preferably combined to form uniform and fine foam cells, and the foam nucleating agents to be used are preferably particulate solids e.g. inorganic particles such as talc, silica, kaoline, zeolite, mica and alumina; carbonate or bicarbonate; salts such as alkali metal salts of carboxylic acids.

In the production method described in Patent Document 1 in which polyalcohols such as glycerin, erythritol and pentaerythritol or polycarboxylic acids such as trimellitic acid and pyromellitic acid are added, polyisocyanate and polylactic acid are mixed to react in the first step and polyalcohols or polycarboxylic acids are necessarily mixed to react in the second step. It is thought that if the order of the reactions is reversed or the reactions are carried out simultaneously, gelation occurs.

In order that the polyalcohols and polycarboxylic acids are added to react in the second step of the above-described production method, additional equipment investment is required and the production process takes longer, thus this is an economic disadvantage.

Also, there is a serious drawback in that heat-resistance of the foam molded article is insufficient because amorphous polylactic acid is used.

PRIOR ART DOCUMENTS

Patent Documents

Patent Document 1: Japanese Laid-Open Patent Publication No. 2000-169546
Patent Document 2: Japanese Laid-Open Patent Publication No. 2000-17039

DISCLOSURE OF THE INVENTION

Problems to be Solved by the Invention

An object of the present invention is to inexpensively provide a method and device of producing a polylactic acid composition having a stable high viscosity, which composition is appropriate for foam molding having a high expansion ratio, and a foam molded article having a high expansion ratio formed of said high viscosity polylactic acid.

Means for Solving the Problems

The polylactic acid composition of the present invention is a polylactic acid composition obtained by mechanically grinding polylactic acid, which polylactic acid is cross-linked by polyisocyanate, by applying a shear force in an inert gas atmosphere, said polylactic acid composition obtained by the grinding being characterized by having an MI value of 0.05 or more and 5 or less, which MI value is measured at 190° C. under a load of 21.6 kg in accordance with JIS K7210 (ISO 1133).

Also, as a preferred embodiment of the present invention, a method of producing a polylactic acid foam molded article is characterized by comprising a step of mechanically grinding said polylactic acid composition by applying a shear force, using a device equipped with an injection molding machine (B) or an extrusion molding machine (G), an orifice portion (S) and a foaming mold (P), in a foaming gas atmosphere in the orifice portion (S).

Effect of the Invention

In the polylactic acid composition of the present invention, a foam cell membrane can be thinner because there are not gelled portions which are obstructive factors of a high expansion ratio foaming, and polylactic acid portions having a considerably high molecular weight, thus, a foam molded article having a high expansion ratio can be provided stably and inexpensively. Also, the foam molded article of the present invention, which uses a polylactic acid composition having stable high melt viscosity without adding polyalcohols and polycarboxylic acids, is a sheet and a container of the foam molded article, which sheet and container can practically stand hot water.

EMBODIMENTS FOR CARRYING OUT THE INVENTION

Figure 1:
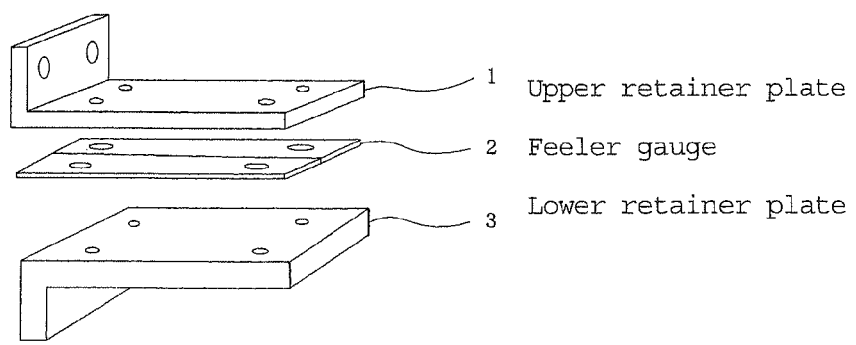
FIG. 1 is a schematic diagram of an orifice portion (S), which has a structure wherein a feeler gauge is inserted between upper and lower retainer plates and which is fixed to a nozzle using bolts and nuts. The feeler gauge used in experiments is 0.1 mm thick, 0.1 mm gap, and 150 mm long.

The polylactic acid composition of the present invention is a polylactic acid composition obtained by mechanically grinding polylactic acid, which polylactic acid is cross-linked by polyisocyanate, by applying a shear force in supercritical condition of an inert gas, wherein the amount of said polyisocyanate combined is 0.4 to 5% by weight based on polylactic acid, said polylactic acid composition obtained by the grinding being characterized by having an MI value of 0.05 or more and 5 or less, which MI value is measured at 190° C. under a load of 21.6 kg in accordance with JIS K7210 (ISO 1133).

Another embodiment of the present invention is a polylactic acid composition wherein said polyisocyanate is triisocyanate, tetraisocyanate or diisocyanate, or which polylactic acid composition comprises any of the adduct forms of said polyisocyanates.

Further, another embodiment of the present invention is said polylactic acid composition containing 0.5 to 5% by weight of calcium carbonate or talc particle.

Further, another embodiment of the present invention is a foam molded article formed of said polylactic acid composition. The foam molded articles include those by foam-molding of pre-expanded beads and those by direct extrusion molding without producing beads.

Further, another embodiment of the present invention is an excellent heat-resistant foam molded article which can maintain the form of a molded article container without deformation after 3 minutes of pouring 90° C. hot water into the container.

As another embodiment of the present invention, a method of producing a polylactic acid foam molded article is characterized by comprising a step of mechanically grinding said polylactic acid composition by applying a shear force, using a device equipped with an injection molding machine (B) or an extrusion molding machine (G), an orifice portion (S) and a foaming mold (P), in supercritical condition of a foaming gas in the orifice portion (S).

Another embodiment of the present invention is a method of producing a foam molded article of the polylactic acid composition which is cross-linked and thickened by polyisocyanate which is triisocyanate, tetraisocyanate or diisocyanate, or by any of the adduct forms of said polyisocyanates.

Another embodiment of the present invention is a method of producing a foam molded article using said thickened polylactic acid composition wherein 0.4 to 5% by weight of a polyisocyanate is combined on the basis of polylactic acid.

Another embodiment of the present invention is a method of producing a foam molded article using said thickened polylactic acid composition containing 0.5 to 5% by weight of calcium carbonate or talc particle.

Isocyanate is reacted with a low-molecular-weight polyalcohol and polycarboxylic acid to generate gelled substances because of the high reactivity. The reaction with high molecules is a reaction with terminal groups, and if the amount of isocyanate is not excessive, a reticulated structure of gelation does not occur. However, although a large reticulated structure which is non-soluble is not generated, molecules having a considerably high molecular weight are generated by developing uneven reactions. When high molecules having a molecular weight of 2 million or more in polystyrene equivalent by GPC measurement are partially present, stretching unevenness of a foam cell membrane occurs and high expansion ratio foaming becomes difficult. More preferred is a composition which does not contain high molecules having a molecular weight of 1.5 million or more in polystyrene equivalent.

In Patent Document 1, it is surmised that because the viscosity is unstable by reason of the considerably large molecules, equilibrium reaction occurs by adding a polyalcohol and a polycarboxylic acid to decrease the molecular weights of the considerably large molecules and a stable foam cell membrane can be obtained. When a monoalcohol and a monocarboxylic acid are used instead of a polyalcohol and a polycarboxylic acid, the molecular weights significantly decreases. This is reversing the order of importance.

The present inventors found that the molecular weights of considerably large molecules, which are generated by the above uneven reactions with isocyanate, decrease by crushing by superfluidity in supercritical conditions of an inert gas to obtain a stable foam cell membrane, and further found that even when 5% by weight of polyisocyanate is combined on the basis of polylactic acid, a gel is not confirmed in cross-linking reactions in supercritical and subcritical conditions, thereby completing the present invention.

Figure 5:
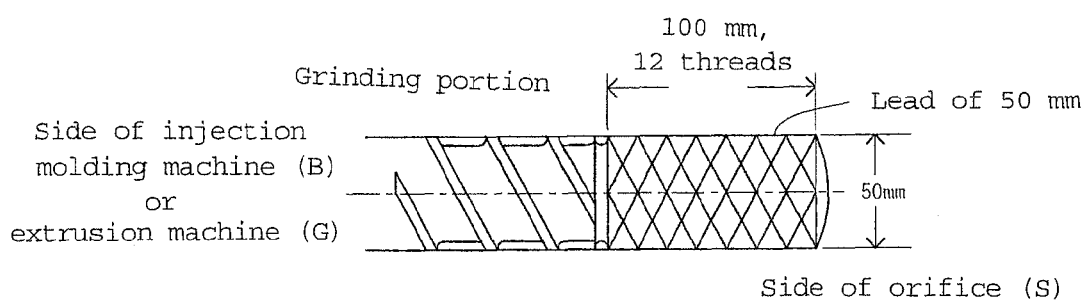
FIG. 5 shows the shape of a screw tip (A) fitted into an injection molding machine (B) or an extrusion machine (G) shown in FIG. 2 or FIG. 3, and a thread groove example of lead of 50 mm and 12 threads (B).
Figure 5:
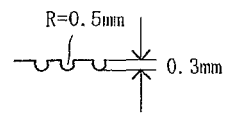

To generate the large shear force in the present invention, the polylactic acid composition is passed through an orifice portion at a high speed under supercritical conditions of nitrogen gas, which orifice portion (S) for example has the shape of a tip of a grinding portion in a screw diameter of 50 mm shown in FIG. 5 and is composed of a slit consisting of (1), (2) and (3) shown in FIG. 1, e.g. a slit portion of 0.1 mm square and 150 mm long. The speed is, for example when 10 ml of the composition is extruded at a stroke of 30 seconds, a high speed of 100,000 cm/30 sec (33 m/sec). If the orifice portion (S) is absent and is composed of only a grinding portion of a screw tip, grinding ability is extremely lowered. When an outer diameter of the screw is 50 mm and the raw materials are polylactic acid, regardless of an inert gas to be used, a preset temperature of the portion is preferably a range of 160 to 180° C., and the pressure thereof usually comes to equilibrium with input of the raw materials in a range of 6 to 12 MPa. However, when the amount of an inert gas becomes insufficient, the raw material polylactic acid cannot pass through the orifice (S) at a high speed and obviously the raw materials are not inserted into the screw and only a small quantity is leaked out from the orifice (S). In conclusion, it is confirmed that the condition of 160° C. or more and 6 MPa or more is numerical values to sufficiently satisfy the supercritical conditions of nitrogen (−147° C., 3.39 MPa). Prior to operating, the conditions of temperature and pressure in the portion related to supercriticality in the present invention is confirmed to be from 160 to 170° C. and from 6 to 12 MPa.

A foaming agent is impregnated into polylactic acid beads while heating under high pressure. When polylactic acid is crystalline, crystallization occurs at this time and microcrystalline network is developed. A melting point of polylactic acid is usually 160° C. or more and steam at normal pressure used for final foam molding is 100° C. or less. The micro crystals generated when a foaming agent was impregnated prevent stretching of a foam cell membrane to obtain a high expansion ratio. Thus, amorphous polylactic acid is used.

On the other hand, heat-resistance of amorphous polylactic acid is low, thus it cannot be used as a container for hot water. Using crystalline polylactic acid, the heat-resistance is improved by microcrystalline network, therefore it can be used for a hot water container. Incidentally, the mouth portion of a PET bottle is white because spherocrystal is caused by crystallization. The mouth portion of the bottle is not crystallized because it cannot be stretched. After blow molding, crystallization by heating is carried out to provide heat-resistance.

Heat-resistance is inversely proportional to mobility of molecules. As the molecular weight increases, the heat resistance is improved. Liquid paraffin is the form of a liquid at normal temperature, while paraffin having a slightly higher molecular weight is a solid at normal temperature. A melting point of polyethylene having a further higher molecular weight is approximately 130° C. A melting point of ultrahigh molecular weight polyethylene increases to 150° C. The theory is the same as a difference between force to roll a small snowball and force to roll a big snowball.

Since polylactic acid is a condensation polymer, the molecular weight varies depending on an equilibrium amount of water. When even high molecular weight polylactic acid is melted after moisture absorption, the molecular weight dramatically decreases and the molecular weight drops to an equilibrium molecular weight corresponding to an water amount. Thus, it is desirable that a vent hole is placed at the initial molten stage in an extrusion machine and moisture is absorbed by a vacuum pump.

Polylactic acid used in the present invention may be crystalline or amorphous. Amorphous polylactic acid wherein DL-forms are copolymerized is used for pre-expanded beads impregnated with a foaming agent. For extrusion foam molding, crystalline polylactic acid is preferred because the heat-resistance is improved. Complex polylactic acid which D-form and L-form are mixed is more preferred because the heat-resistance is further improved.

A number average molecular weight of said raw material polylactic acid is preferably 1,000 or more, more preferably 5,000 or more, and further preferably 10,000 or more. As the molecular weight of the raw material polylactic acid decreases, the compounding amount of polyisocyanate, which is reacted to obtain required viscosity when molding at a high expansion ratio, increases. This is an economic disadvantage.

Also, at the point when the number average molecular weight of polylactic acid by the ring-opening solution polymerization of lactic acid dimer is 10,000 or less, a polyisocyanate solution or a low temperature solution is added beforehand in an amount of 0.5 to 5% by weight, and polylactic acid which is branched like LDPE and which is polymerized to the number average molecular weight 500,000 or more can be used as the polylactic acid materials of the present invention.

The raw material polylactic acid is dried by usual methods such as vacuum drying beforehand and moisture percentage is controlled. The moisture percentage of the raw material polylactic acid is preferably 500 ppm or less, and further preferably 100 ppm or less. More preferred is 50 ppm or less. When polyisocyanate is reacted with water, carbon dioxide is generated and polyisocyanate becomes inactive, consequently efficiency of polyisocyanate becomes low. The high moisture percentage of the raw material polylactic acid leads to an economic disadvantage.

Polyisocyanate to be used for the present invention is divalent or more polyisocyanate, and preferably triisocyanate or tetraisocyanate, or contains the adduct forms of diisocyanate. When trivalent or more polyisocyanate is used, branches occur on a high molecular chain of polylactic acid and membrane strength becomes high, thus the expansion ratio can be improved.

Polyisocyanate may be isocyanate compounds containing 2 or more isocyanate groups in the molecule. Examples of polyisocyanate include aliphatic diisocyanates such as 1,6-hexamethylene diisocyanate, 3-isocyanatomethyl-3,5,5-trimethylcyclohexyl isocyanate (isophorone diisocyanate), 1,4-tetramethylene diisocyanate, 2,4,4-trimethyl hexamethylene diisocyanate, 2,2,4-trimethyl hexamethylene diisocyanate, dicyclohexylmethane-4,4'-diisocyanate, methylcyclohexyl-2,4-diisocyanate, methylcyclohexyl-2,6-diisocyanate, xylylene diisocyanate, 1,3-bis(isocyanate)methylcyclohexane, tetramethyl xylylene diisocyanate, trans-cyclohexane-1,4-diisocyanate, and lysine diisocyanate; alicyclic polyisocyanates such as isophorone diisocyanate, hydrogenated diphenylmethane diisocyanate, hydrogenated tolylene diisocyanate, hydrogenated xylylene diisocyanate, hydrogenated tetramethyl xylylene diisocyanate, and cyclohexane diisocyanate; aromatic diisocyanates such as 2,4-toluylene diisocyanate, 2,6-toluylene diisocyanate, diphenylmethane-4,4'-isocyanate, 1,5'-naphthene diisocyanate, tolidine diisocyanate, diphenylmethylmethane diisocyanate, tetraalkyl diphenylmethane diisocyanate, 4,4'-dibenzyldiisocyanate, and 1,3-phenylene diisocyanate; triisocyanate compounds such as lysine ester triisocyanate, triphenylmethane triisocyanate, 1,6,11-undecane triisocyanate, 1,8-isocyanate-4,4-isocyanate methyloctane, 1,3,6-hexamethylene triisocyanate, bicycloheptane triisocyanate, the adduct forms of trimethylolpropane and 2,4-toluylenediisocyanate, and the adduct forms of trimethylolpropane and diisocyanate such as 1,6-hexamethylene diisocyanate; denatured polyisocyanate compounds obtained by reacting a polyalcohol such as glycerin or pentaerythritol with said aliphatic and aromatic diisocyanate compound and said triisocyanate compound; and the like. These compounds may be used individually or two or more compounds can be used in combination.

Branches occurs on a polylactic acid molecular chain by using trivalent or more polyisocyanate, and that is preferred because the strength of a foam cell membrane increases. This phenomenon is same as that when a film is produced using polyethylene, low density polyethylene having branches on a high molecular chain is more suitable than straight high density polyethylene.

The amount of polyisocyanate to be combined varies depending on the molecular weight of the raw material polylactic acid. Also it varies depending on the molecular weight distribution of polylactic acid. As low molecular weight polylactic acid increases, the more amount of polylactic acid to be combined requires to obtain suitable melting viscosity for foaming. The amount is preferably approximately 0.5 to 5% by weight based on polylactic acid. When the compounding amount of polyisocyanate is too little, melting viscosity appropriate for foaming cannot be obtained and the expansion ratio is lowered. Also, when the amount is too much, gelation occurs and the expansion ratio is lowered.

A method of producing the polylactic acid composition of the present invention requires a step of, after increasing the molecular weight of the polylactic acid composition by coupling reactions of polylactic acid and polyisocyanate, grinding considerably large polylactic acid molecules by mechanically applying a large shear force in supercritical conditions of an inert gas. Without this step, considerably large polylactic acid molecules partially prevent a foam cell membrane from expanding and a foam molded article having a high expansion ratio cannot be obtained.

Examples of inert gases of the present invention which do not react with polylactic acid include nitrogen gas, helium gas, argon gas, methane gas, ethane gas, propane gas, butane gas, ethylene gas, propylene gas and the like. Among these, nitrogen gas which easily reaches the supercritical conditions and which is cheap and nonflammable is preferred. These gases may be used in combination. The supercritical point of nitrogen gas is (−147° C., 3.39 MPa) and that of methane gas is (−83° C., 4.6 MPa). That of ethane gas is (32.4° C., 4.88 MPa). That of propane gas is (93.8° C., 4.25 MPa). That of butane gas is (152° C., 3.38 MPa). When beads are produced, an inert gas is supplied in a certain amount to be combined in an amount of 0.1 to 2% by weight based on raw material polylactic acid, and the gas is collected and reused after trapping moisture.

A general means for applying more pressure than the pressure of supercritical points is pressure devices such as s plunger pump, a gear pump and a screw, and a means for heating higher than the temperature of supercritical points is heating devices such as a cast heater and a jacket heater.

A melting point of polylactic acid varies depending on a degree of copolymerization, and is approximately 170° C. or less. In the present invention, polylactic acid is reacted with polyisocyanate at a higher temperature than the melting point of polylactic acid materials to be used. In the present invention, polyisocyanate which is not in the form of a liquid at normal temperature is melted by heating and is quantitatively added to polylactic acid materials in a semi-molten state by a plunger pump and the like to react with the polylactic acid. In mixing a high viscosity reactant and a low viscosity compound, when the high viscosity reactant is mixed in a semi-molten state at a low temperature, it is well dispersed beforehand and a more uniform reaction can be expected.

To the polylactic acid composition of the present invention, other biodegradable polymers can be combined without having a significantly bad influence on physicality of foam molded articles. Examples of other biodegradable polymers include polycaprolactam, polybutylene succinate, polyhydroxybutyrate, poly(hydroxybutyrate/hydroxyhexanoate), (polylactic acid/polybutylene succinate type)block copolymer, poly(caprolactone/putylene succinate, poly(putylene succinate/adipate), poly(putylene succinate/carbonate, poly (ethylene terephthalate/succinate), poly(putylene adipate/terephthalate), poly(tetramethylene adipate/terephthalate), and the like.

A foaming nucleating agent is preferably combined to form uniform and fine foaming cells. Examples of foaming nucleating agents include inorganic particles such as talc, silica, kaoline, zeolite, mica and alumina; carbonate or bicarbonate such as calcium carbonate; alkali metal salts of carboxylic acid; and the like. Among them, calcium carbonate and talc are preferred because they are soft and microscopic particles thereof can be obtained cheaply. In high expansion ratio foaming, since thickness of foam cell membranes becomes thin, particle diameters of the foaming nucleating agents are preferably 1 µm or less, and more preferably 0.5 µm or less. The amount of a foaming nucleating agent to be combined is preferably 0.5 to 5% by weight based on polylactic acid composition. When the amount of a foaming nucleating agent to be combined is too little, the size of cells easily becomes uneven, and when the amount is too much, a high expansion ratio is hard to be obtained.

In the present invention, an inert foaming gas such as nitrogen gas is supplied to the polylactic acid composition of the present invention in a molten state by side-injection to foam. In this case, it is preferred that foam molding is carried out under conditions of high temperature and high pressure more than those of supercritical points and subcritical conditions of inert foaming gases such as nitrogen gas since foam molded articles having fine cells can be obtained. Examples of inert foaming gases in addition to nitrogen gas include as foaming agents hydrocarbons such as propane, n-butane, isobutane, n-pentane, iso-pentane, neopentane, cyclopentane, hexane and butane; halogenated hydrocarbons such as chloromethane, methylene chloride and dichlorodifluoromethane; ethers such as dimethylether and methylethylether. Also, as auxiliary foaming agents, alcohol having 1 to 4 carbon atoms, ketones, ethers, benzene, toluene and the like are used. These foaming agents can be used in combination.

Figure 2:
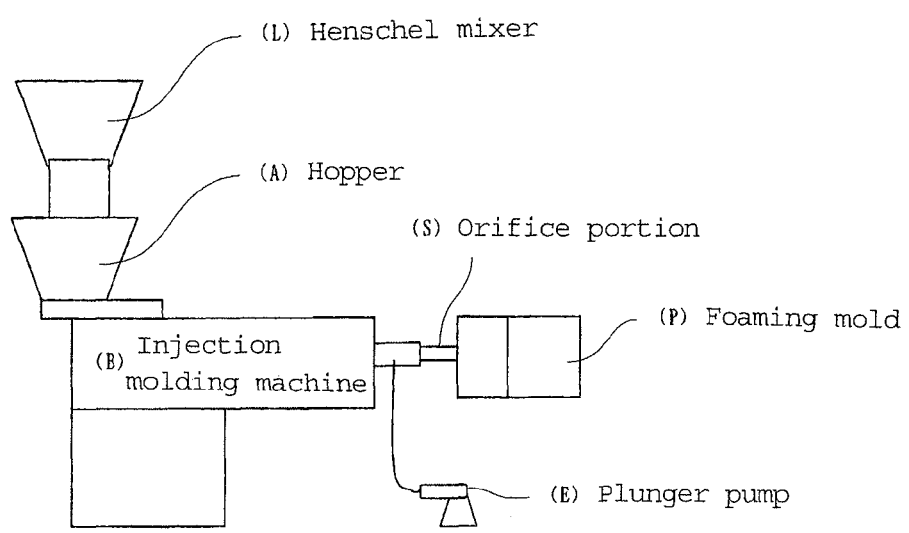
FIG. 2 is a rough schematic diagram of a processing machine system used for examples of foam injection by direct extrusion.

A production system of the foam molded articles of the present invention is composed of an injection molding machine (B), a Henschel mixer (L), a hopper (A), an orifice portion (S) and a foaming mold (P) as an example of a simple system shown in FIG. 2.

Figure 4:
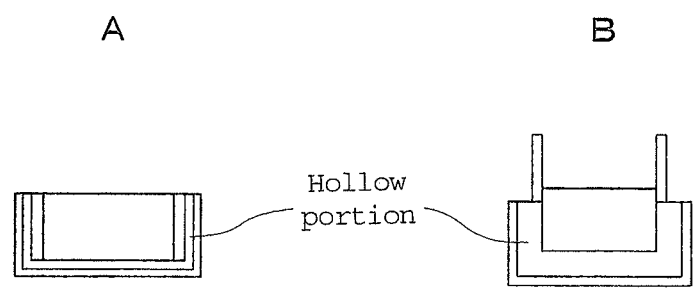
FIG. 4 is a rough schematic diagram of a thin hollow portion in a filled state (A) and the hollow portion expanded by moving the convex portion in a foamed state (B) in cross-section of the foaming mold having the hollow portion of variable thickness.

A hollow portion of the foaming mold (P) used in the present invention is movable. It is suitable for simple shaped products and not suitable for complicated shaped products. In the first step, injections of a molten polymer starts when the hollow portion is in a thin state (e.g. 0.1 mm, FIG. 4A), and in the second step, it is gradually expanded to a final shape (FIG. 4B). As temperature of the polymer is lowered to suitable temperature of 100° C. or less, the polymer becomes solidified, and in the meantime, the polymer is measured and injected to be a specified expansion ratio. A given foaming product is obtained by foaming at a higher temperature than softening temperature of the polymer over 30 seconds to 1 minute and then cooling to stabilize. Because of the foaming and cooling time, this injection molding cycle takes longer time than a general injection molding cycle which has only the cooling time.

Figure 3:
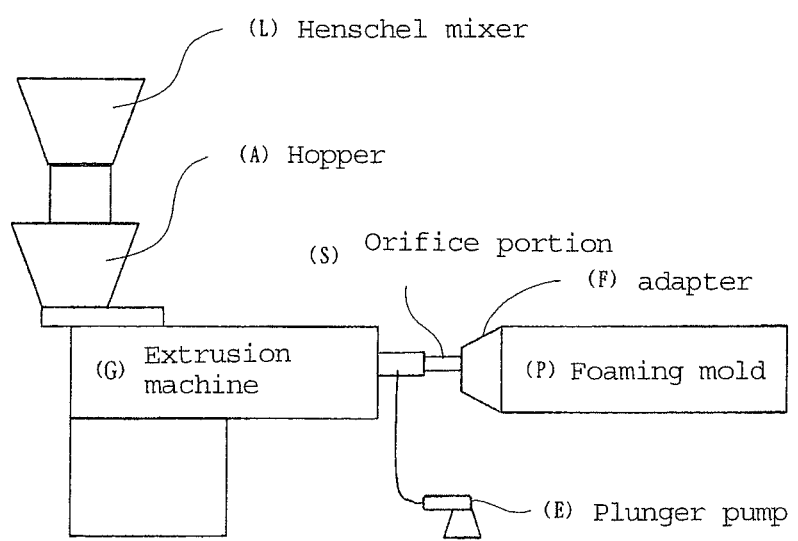
FIG. 3 is a rough schematic diagram of a processing machine system used for examples of foam sheet molding by direct extrusion.

When the molded article of the present invention is a continuous foaming sheet, the production system has a structure connecting a generally known T-die instead of an adapter (F) and a foaming mold (P) shown in FIG. 3.

In said molded articles, additives which are generally used such as colorants, flame retardants, fresheners, stabilizing agents, antibacterial agents and fungicides can be used without influencing biodegradability and quality of the foaming molded articles.

In the present invention, MI values were measured as weight (g) for 10 minutes or weight (g) equivalent to that for 10 minutes by the method in which a polylactic acid composition after reactions with polyisocyanate flowed under conditions of an orifice diameter of 2 mm and an orifice long of 10 mm at 190° C. under a load of 21.6 kg, and the raw material polylactic acid flowed under conditions of an orifice diameter of 1 mm and an orifice long of 10 mm under a load of 2.16 kg, in accordance with JIS K7210 (ISO1133). For measurement of a foam expansion ratio, 1 ml of a foam molded article was cut out to measure weight g1, and 1 ml of the polylactic acid composition of the present invention was cut out to measure weight g2, and then the foam expansion ratio was measured as a quotient by splitting g2 by g1. The moisture percentage of the raw material polylactic acid and the like is measured by the Karl Fischer method. Heat-resistance of a foam molded article is evaluated as good when 90° C. hot water was poured to a depth of 80% of a box shaped molded article and it did not become deformed after 3 minutes. When boiling water was poured in the same manner and it did not become deformed after 3 minutes, heat-resistance was evaluated as excellent. When deformation was detected after pouring hot water, it was evaluated as poor.

Considerably large molecules are measured as molecular weight distribution in PSt equivalent by GPC.

The details will be described by way of examples thereof.

EXAMPLES

Production Example 1

Commercially available L-lactide and D-lactide were purified by recrystallization using ethyl acetate. Into an autoclave equipped with a stirrer, 90 parts by weight of the purified L-lactide, 10 parts by weight of the purified D-lactide and 0.5 parts by weight of tin octylate as a catalyst were charged, followed by deaeration under reduced pressure, and then ring-opening polymerization was carried out under polymerization conditions, i.e. in N2 atmosphere at 190° C. for 0.5, 1 and 2 hours. After reaction termination, polymer was taken out from the autoclave in the form of funicular, and after quench, the raw material polylactic acid pellets were produced by cutting with a rotary cutter. The pellets were dried in a vacuum drier at 80° C. for 24 hours, and then the dried pellets were put into an aluminum bag sealed with nitrogen and they were stored for use. Those which have 100 ppm or less of moisture percentage were used as the raw material polylactic acid. The MI values of samples P0.5, P1 and P1.5, each of whose polymerization times was 0.5, 1 and 1.5 hours, under a load of 2.16 kg were 800, 420 and 88 respectively.

Example 1

Injection Foam Molding

A production system having a structure shown in FIG. 2 was used. A processing machine composed of a Henschel mixer for mixing and stirring (L), a hopper for supplying materials (A), an injection molding machine (B), a plunger pump for supplying foaming gas (E), an orifice (S) and a foaming mold (P) was used.

Using the simple processing machine system shown in FIG. 2, 100 parts by weight of the raw material polylactic acid pellets, each having the MI values of 800, 420 and 88 produced in Production Example 1, 1.5, 1 and 0.5 parts by weight, respectively, of an adduct form of 1,6-hexamethylene diisocyanate and trimethylolpropane in the form of a liquid at normal temperature, and 1 part by weight of fine talc powder having an average particle diameter of 0.4 μm were quantitatively supplied into the Henschel mixer (L) and mixed, and the obtained mixture was supplied in a certain amount from the hopper (A) sealed with nitrogen gas into the injection molding machine (B). From the side plunger pump for supplying nitrogen gas (E), 2% by weight of nitrogen gas was injected based on polylactic acid composition and the polylactic acid composition was extruded from the orifice portion (S), which had a slit with dimensions of 0.1 mm square and 150 mm long shown in FIG. 1, to a box shaped mold (P), which was maintained at 40° C. and which was 10 mm thick and 90 mm depth and external dimensions of 100 mm square, at a stroke of 30 sec at 170° C. to produce injection foam molded articles T1, T2 and T3 of the present invention. The temperature and pressure of the orifice portion in the above step are approximately 170° C. and 8 MPa, and nitrogen in the orifice portion reaches the supercritical state. Said polylactic acid composition is mechanically grinded by a shear force when extruded from the orifice portion in the supercritical state of nitrogen, and also said polylactic acid composition is foamed by talc powder.

The expansion ratios of T1, T2 and T3 were 22 times. All of the heat-resistance was excellent. After defoaming, the MI values of T1, T2 and T3 measured under a load of 21.6 kg were 0.5, 0.2 and 0.1, respectively. Also, considerably large molecular weight substances of 1.5 million or more in polystyrene equivalent were not detected by GPC measurement of T1, T2 and T3.

Example 2

Beads and Foam Molded Articles

To a processing device with a 50 mm screw produced in Japanese Patent No. 4044952, a general underwater cutter was fixed, and the device was used. The screw used in the device did not have an orifice groove, and this portion was used in the form of an screw outer diameter as it was. The orifice was composed by inserting a sleeve, having an inner diameter bigger by 0.2 mm than the screw outer diameter, into a cylinder of this portion. A combination of 100 parts by weight of the raw material polylactic acid having the MI value of 88 produced in Production Example 1, 0.5 parts by weight of an adduct form of 1,6-hexamethylene diisocyanate and trimethylolpropane in the form of a liquid at normal temperature, and 1 part by weight of fine talc powder having an average particle diameter of 0.4 μm was mixed and stirred by a Henschel mixer (L), followed by batch feeding to a hopper (A), and 0.2% by weight of nitrogen gas was intermittently and quantitatively supplied based on polylactic acid composition, and the polylactic acid was extruded from the orifice, and the extruded composition was cooled in water and cut by a underwater cutter to obtain circular pellets. Like Example 1, the temperature and pressure in the orifice portion were set up to be the supercritical state of the inert gas (nitrogen). The pellets were dried in a vacuum drier at 80° C. for 24 hours, and then the dried pellets were put into an aluminum bag sealed with nitrogen and they were stored, and circular pellets of the polylactic acid composition of the present invention were produced.

Into an autoclave, 100 parts by weight of said circular pellet and 5 parts by weight solution of isobutane:methanol, 2:1, were charged, and the autoclave was maintained at 70° C. for 1 hour, followed by cooling it to normal temperature to produce foam beads of the present invention.

A given amount of said beads was poured into a mold and the mold was heated and foamed by steam for 1 minute to produce a foam molded article T4 of the polylactic acid composition of the present invention. The expansion ratio of the foam molded article was 28 times. All of the heat-resistance was excellent. The MI value of the foam molded product measured under a load of 21.6 kg was 0.2. Considerably large molecular weight substances of 1.5 million or more in polystyrene equivalent were not detected by GPC measurement.

Comparative Example 1

Injection Foam Molding

For comparison, comparative products C1, C2 and C3 were produced in the same conditions except that the orifice portion (S) providing a shear force in Example 1 was removed, and all of C1, C2 and C3 had the expansion ratios of under 5 times, which expansion ratios were partially uneven. Since the expansion ratio did not increase to a given value, they could not be molded in a box shape. Considerably large molecular weight substances of above 2 million in polystyrene equivalent by GPC measurement were measured in an amount of 1% by weight or more.

This is surmised that because the orifice portion (S) providing a shear force was removed, the polylactic acid composition having considerably large molecular weight prevented a foam cell membrane from stretching and the expansion ratios did not increase.

Comparative Example 2

Bead Foam Molding

For comparison, the sleeve used in Example 2 was removed and a larger sleeve by 2 mm than the screw outer diameter was inserted to be used. A comparative product produced in the same conditions as in Example 2 had an expansion ratio of under 5 times, which expansion ratio was partially uneven. Since the expansion ratio did not increase to a given value, it could not be molded in a box shape. Considerably large molecular weight substances of above 2 million in polystyrene equivalent by GPC measurement were measured in an amount of 1% by weight or more.

Comparative Example 3

Injection Molding

Using the raw material polylactic acid having the MI value of 800 under a load of 2.16 kg produced in Production Example 1, a foam molded article C33 was produced in the same manner as in Example 1 except that the compounding amount of an adduct form of 1,6-hexamethylene diisocyanate and trimethylolpropane was changed into 0.3 parts by weight, and the MI value of C33 under a load of 21.6 kg was 8. It could not be molded in a box shape because the viscosity was insufficient and the expansion ratio was low.

Comparative Example 4

Injection Foam Molding

Using the raw material polylactic acid having the MI value of 88 under a load of 2.16 kg produced in Production Example 1, a foam molded article C43 was produced in the same manner as in Example 1 except that the compounding amount of an adduct form of 1,6-hexamethylene diisocyanate and trimethylolpropane was changed into 3 parts by weight, and the MI value of C43 under a load of 21.6 kg was 0.003. It could not be molded in a box shape because the viscosity was too high and the expansion ratio was low.

Example 3

Injection Foam Molded Article

A production system having a structure shown in FIG. 2 was used. A processing machine composed of a Henschel mixer for mixing and stirring (L), a hopper for supplying materials (A), an injection molding machine (B), a plunger pump for supplying a foaming gas (E), an orifice (S) and a foaming mold (P) was used.

Using the simple processing machine system shown in FIG. 2, 100 parts by weight of the raw material polylactic acid pellets P0.5, P1 and P1.5, each of whose MI values was 800, 420 and 88 respectively, produced in Production Example 1, 1.5, 1 and 0.5 parts by weight, respectively, of an adduct form of 1,6-hexamethylene diisocyanate and trimethylolpropane in the form of a liquid at normal temperature and, 1 part by weight of fine talc powder having an average particle diameter of 0.4 μm were quantitatively supplied into the Henschel mixer (L) and mixed, and the obtained mixture was supplied in a certain amount from the hopper (A) sealed with nitrogen gas into the injection molding machine (B). From the side plunger pump for supplying nitrogen gas (E), 2% by weight of a mixed gas of nitrogen gas and methanol, a content ratio 2:1, was injected to the polylactic acid composition, and the polylactic acid composition was extruded at 170° C. into a foaming mold (P) with the orifice portion (S) whose size was 0.1 mm square and 150 mm long shown in FIG. 1, and wherein the forming mold was maintained at 100° C. and had a 0.2 mm thick hollow portion as shown in FIG. 4A, and after the temperature of the injected polylactic acid became 100° C., the thickness of the hollow portion in the mold was changed into 4 mm as shown in FIG. 4B (foamed for 30 sec to fill the hollow portion, followed by cooling the mold to 40° C., and maintained for 30 sec to produce injection foam molded articles T11, T12 and T13 of the present invention. The temperature and pressure in the orifice portion were adjusted to be the supercritical state of an inert gas (the mixed gas of nitrogen gas and methanol).

A foam molded product T33 of the present invention was produced in the same manner as the above except that the amount of fine talc powder was changed into 0.3 parts by weight, and the MI value of T33 under a load of 21.6 kg was still 0.1 but the heat-resistance was good.

The expansion ratios of T11, T12 and T13 were 20 times. All of the heat-resistance was excellent. The MI values of T11, T12 and T13 measured under a load of 21.6 kg were 0.5, 0.2 and 0.1, respectively. Also, considerably large molecular weight substances of 1.5 million or more in polystyrene equivalent were not detected by GPC measurement of T1, T2 and T3.

Example 4

Extrusion Foam Sheet

Using a processing system having a structure connecting a generally known T-die for molding sheets instead of an adapter (F) and a foaming mold (P) shown in FIG. 3, 100 parts by weight of the raw material polylactic acid pellet P1.5 having the MI value of 88 produced in Production Example 1, 1.5 parts by weight of an adduct form of 1,6-hexamethylene diisocyanate and trimethylolpropane in the form of a liquid at normal temperature, and 1 part by weight of fine talc powder having an average particle diameter of 0.4 μm were quantitatively and continuously supplied into the Henschel mixer (L) and mixed, and the obtained mixture was supplied in a certain amount from the hopper (A). From the side plunger pump for supplying nitrogen gas (E), 1.0% by weight of nitrogen gas and methanol, a content ratio 2:1, was intermittently supplied in a certain amount based on polylactic acid composition, and the polylactic acid composition was extruded in the form of a sheet of 0.5 mm thick and 30 cm width, which sheet was cooled to 100° C., to sheet collecting apparatus which was maintained at 100° C. and set to 10 cm thick, via the orifice portion (S) providing a shear force. After a foam molding portion maintained at 100° C. for 30 sec, the sheet was passed through a cooling portion at 40° C., and cut to a defined length in a cooled state which was lower by 5° C. than Tg of polylactic acid to produce a foam molded sheet of the present invention. The temperature and pressure were adjusted to be the supercritical state of an inert gas (the mixed gas of nitrogen gas and methanol) in the orifice portion.

The heat-resistance of the sheet was excellent. The MI value of the foam molded product measured under a load of 21.6 kg was 0.2. Considerably large molecular weight substances of 1.5 million or more in polystyrene equivalent were not detected by GPC measurement.

Comparative Example 5

Injection Foam Molding

For comparison, comparative products C1, C2 and C3 were produced in the same conditions except that the orifice portion (S) providing a shear force in Example 3 was removed, and all of C1, C2 and C3 had the expansion ratios of under 5 times, which expansion ratios were partially uneven. Considerably large molecular weight substances of above 2 million in polystyrene equivalent by GPC measurement were measured in an amount of 1% by weight or more.

This is surmised that because the orifice portion (S) providing a shear force was removed, the polylactic acid composition having considerably large molecular weight prevented a foam cell membrane from stretching and the expansion ratios did not increase.

Comparative Example 6

Extrusion Foam Molding

For comparison, a comparative product C4 was produced in the same conditions except that the orifice portion (S) providing a shear force in Example 4 was removed, and C4 had the expansion ratio of under 5 times, which expansion ratio was partially uneven. Since the expansion ratio did not increase to a given value, it could not be molded in a box shape. Considerably large molecular weight substances of above 2 million in polystyrene equivalent by GPC measurement were measured in an amount of 1% by weight or more.

Example 5

A foam molded product T33 of the present invention was produced in the same manner as that of T3 in Example 3 except that the amount of fine talc powder was changed into 0.3 parts by weight, and the MI value of T33 under a load of 21.6 kg was still 0.1 but the heat-resistance was good.

Example 6

Using the raw material polylactic acid P0.5 having the MI value of 800 under a load of 2.16 kg produced in Production Example 1, a foam molded article C33 was produced in the same manner as in Example 3 except that the compounding amount of an adduct form of 1,6-hexamethylene diisocyanate and trimethylolpropane was changed into 0.5 parts by weight, and the MI value of C33 under a load of 21.6 kg was 4.2, and the heat-resistance was good.

Comparative Example 7

Extrusion Foam Molding

Using the raw material polylactic acid P0.5 having the MI value of 800 under a load of 2.16 kg produced in Production Example 1, a foam molded article C33 was produced in the same manner as in Example 4 except that the compounding amount of an adduct form of 1,6-hexamethylene diisocyanate and trimethylolpropane was changed into 0.25 parts by weight, and the MI value of C33 under a load of 21.6 kg was 7. Although the optimal condition was searched, the expansion ratio was stopped at 3.8 times.

Comparative Example 8

Using the raw material polylactic acid having the MI value of 88 under a load of 2.16 kg produced in Production Example 1, a foam molded article C43 was produced in the same manner as in Example 2 except that the compounding amount of an adduct form of 1,6-hexamethylene diisocyanate and trimethylolpropane was changed into 3 parts by weight, and the MI value of C43 under a load of 21.6 kg was 0.003, and the suitable expansion ratio condition could not be found because the viscosity was too high to easily extrude.

EXPLANATIONS OF LETTERS OR NUMERALS

1 Upper retainer plate
2 Feeler gauge
3 Lower retainer plate
A hopper: a device equipped with a volumetric feeder, and preferably purged by nitrogen gas
B Injection molding machine: preferably having a vent hole for suction by a vacuum pump along the path to an extrusion machine portion
G Extrusion machine: preferably having a vent hole for suction by a vacuum pump along the portion
E Side plunger pump for supplying a foaming gas
L Henschel mixer: a device into which polylactic acid, polyisocyanate, calcium carbonate or talc, other additives and the like are measured and charged to mix and stir, and preferably a device which can be filled with nitrogen gas
P Foaming mold: generally used but having a special structure and described in [0047] in description
S Orifice portion: composed of an upper retainer plate (1), a lower retainer plate (3) and a feeler gauge (2)

The invention claimed is:
1. A method of producing a polylactic acid composition with an MI value of 0.05 or more and 5 or less, the MI value being measured at 190° C. under a load of 21.6 kg in accordance with JIS K7210 (ISO 1133), comprising:

crosslinking a polylactic acid with a polyisocyanate to generate a cross-linked polylactic acid, including a large cross-linked polylactic acid molecule which inhibits foaming, and mechanically grinding the cross-linked polylactic acid, by applying a shear force to decrease a molecular weight of the large cross-linked polylactic acid molecule, the amount of the polyisocyanate combined being 0.4 to 5% by weight based on the polylactic acid, the grinding being conducted in supercritical condition of an inert gas, the shear force being applied in an orifice portion having a slit or a sleeve from which the polylactic acid composition is extruded, by allowing the cross-linked polylactic acid to pass through the orifice portion, the temperature in the orifice portion being from 160 to 180° C., and the pressure in the orifice portion being from 6 to 12 MPa.

2. The method according to claim 1, wherein a number average molecular weight in a polystyrene equivalent of the polylactic acid composition obtained by the grinding measured by GPC is less than 1.5 million.

3. The method according to claim 1, and selecting the polyisocyanate as one of triisocyanate, tetraisocyanate, diisocyanate, and any of the adduct forms of said polyisocyanates.

4. The method according to claim 1, and adding 0.5 to 5% by weight of calcium carbonate or talc particle.

5. The method according to claim 1, wherein the polylactic acid composition has a composition which does not contain high molecules having a molecular weight of 1.5 million or more in polystyrene equivalent.

6. The method according to claim 1, wherein the grinding is conducted in supercritical condition of nitrogen gas, or the mixed gas of nitrogen gas and methanol.

7. A method of producing a foam molded article of a polylactic acid composition with an MI value of 0.05 or more and 5 or less, the MI value being measured at 190° C. under a load of 21.6 kg in accordance with JIS K7210 (ISO 1133), comprising:

crosslinking a polylactic acid with a polyisocyanate to generate a cross-linked polylactic acid, including a large cross-linked polylactic acid molecule which inhibits foaming, mechanically grinding the cross-linked polylactic acid, by applying a shear force to decrease a molecular weight of the large cross-linked polylactic acid molecule, the amount of the polyisocyanate combined being 0.4 to 5% by weight based on polylactic acid, the grinding being conducted in supercritical condition of an inert gas, the grinding being conducted by the use of a device equipped with an injection molding machine (B) or an extrusion molding machine (G), an orifice portion (S) having a slit or a sleeve in which the shear force is applied and from which the polylactic acid composition is extruded, and a foaming mold (P), in supercritical condition of a foaming gas in the orifice portion (S), the shear force being applied by allowing the cross-linked polylactic acid to pass through the orifice portion, the temperature in the orifice portion being from 160 to 180° C., and the pressure in the orifice portion being from 6 to 12 Mpa, and forming the foam molded article of the polylactic acid composition.

8. The method according to claim 7, wherein a number average molecular weight in a polystyrene equivalent of the polylactic acid composition obtained by the grinding measured by GPC is less than 1.5 million.

9. The method according to claim 7, and selecting the polyisocyanate as one of triisocyanate, tetraisocyanate, diisocyanate, and any of the adduct forms of said polyisocyanates.

10. The method according to claim 7, and adding 0.5 to 5% by weight of calcium carbonate or talc particle.

11. The method according to claim 7, wherein the polylactic acid composition has a composition which does not contain high molecules having a molecular weight of 1.5 million or more in polystyrene equivalent.

12. The method according to claim 7, wherein the grinding is conducted in supercritical condition of nitrogen gas, or the mixed gas of nitrogen gas and methanol.

\* \* \* \* \*